United States Patent [19]
Tanaka et al.

[11] Patent Number: 5,199,548
[45] Date of Patent: Apr. 6, 1993

[54] CONTROLS IN A GOODS ASSORTING DEVICE

[75] Inventors: Michihiro Tanaka; Junichi Teruta; Shigeo Yamanishi, all of Amagasaki, Japan

[73] Assignee: Hitachi Kiden Kogyo K.K., Amagasaki, Japan

[21] Appl. No.: 770,428

[22] Filed: Oct. 3, 1991

[51] Int. Cl.$^5$ .............................................. B65G 43/00
[52] U.S. Cl. ................................. 198/502.4; 198/619; 198/805
[58] Field of Search ...................... 198/502.4, 619, 805

[56] References Cited

U.S. PATENT DOCUMENTS

| | | | |
|---|---|---|---|
| 3,989,164 | 11/1976 | Hager | 198/619 X |
| 4,792,036 | 12/1988 | Heidelberg | 198/619 |
| 5,054,601 | 10/1991 | Sjogren et al. | 198/805 X |
| 5,069,326 | 12/1991 | Sakamoto et al. | 198/619 |

FOREIGN PATENT DOCUMENTS 1-81602  3/1989  Japan .

Primary Examiner—Robert P. Olszewski
Assistant Examiner—Cheryl L. Gastineau
Attorney, Agent, or Firm—Wenderoth, Lind & Ponack

[57] ABSTRACT

A control system in a goods assorting apparatus whereby the moving state of an assorting carrier by the linear motor driving system is detected by a group of photoelectric switches which are arranged at regular intervals in each section of a reaction plate for detection of the speed of the assorting carrier and issuance of synchronizing signals. This control device ensures accurate dividing of goods into the specified assorting destination.

1 Claim, 4 Drawing Sheets a - Rationalization checking
b - Measuring of moving time
c - Coding
d - Synchronising signal
e - Speed detection
f - Abnormality detection
g - Assorting control signal
h - Abnormality signal
i - Speed adjustment
j - Watchdog timer
k - Speed instruction
l - State indication

CONTROLS IN A GOODS ASSORTING DEVICE

BACKGROUND OF THE INVENTION

Field of the Invention

This invention relates to controls for controlling the speed of an assorting carrier and for issuing synchronizing signals to determine the position of an assorting carrier in the goods assorting apparatus.

In the goods assorting apparatus, it is required to control an assorting carrier so as to be at a specified speed and to confirm that an assorting carrier has reached the specified assorting chute so as to assort goods loaded on the assorting carrier to the desired destination (assorting chute). For this purpose, a means of detecting the speed of an assorting carrier and issuing synchronizing signals corresponding to the movement of an assorting carrier for identifying the position of the assorting carrier which is moving was required. In the conventional goods assorting apparatus, a means of detecting the rotational speed of a driving mechanism for the assorting carrier in relation to the axis of rotation is provided for detecting the speed of the assorting carrier and for issuing synchronizing signals.

However, if the driving system for the assorting carrier is a linear motor driving system, rotation of a driving part does not exist and therefore it is impossible to detect the speed and issue synchronizing signals by detecting the rotation of the axis of rotation.

In view of the above, the Japanese Laid-Open Patent Application No. 64-81602, for example, disclosed the method whereby a reaction plate provided for an assorting carrier is detected by two sets of photoelectric switch for detecting the speed and issuing synchronizing signals.

In the above method, a detection signal of pulse waveform is issued in correspondence to the movement of a reaction plate; pulse synchronizing between ON and OFF of the detection signal is determined; an interpolation pulse is formed by carrying out pulse interpolating and is fractionized; information is coded and synchronizing signals are issued. In this method, however, the interpolation pulse is formed on the assumption that the moving speed of the assorting carrier does not change or remains almost the same during the time of the next pulse period. Therefore, in the case where the speed of the assorting carrier has changed, the time of the pulse period changes and consequently the interpolation pulse lags and synchronizing signals cannot be issued timely. Thus, it is difficult to follow the change of speed of the assorting carrier, with the result that the assorting control cannot be done accurately.

The present invention has for its object to change the pulse signal according to any change of the speed of the assorting carrier and to obtain synchronizing signals for improving the precision of assorting operations.

In order to attain the above object, the main point of the present invention is that the moving state of an assorting carrier by the linear motor driving system is detected by a group of photoelectric switches (16 pcs.) which are arranged at regular intervals in each section of a reaction plate for detection of the speed of the assorting carrier and issuance of synchronizing signals, whereby goods are assorted accurately to the specified assorting destination.

BRIEF DESCRIPTION OF THE DRAWINGS

The nature and advantage of the present invention will be understood more clearly from the following description made with reference to the accompanying drawings, in which.

DETAILED DESCRIPTION OF THE INVENTION

Figure 1:
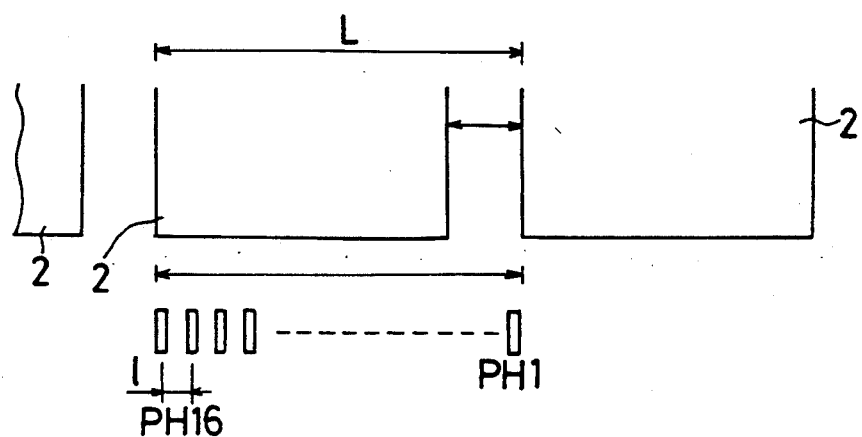
FIG. 1 is an explanatory drawing, showing a photoelectric switch part.

The present invention is described below on the basis of an embodiment shown in the drawings.

Figure 5:
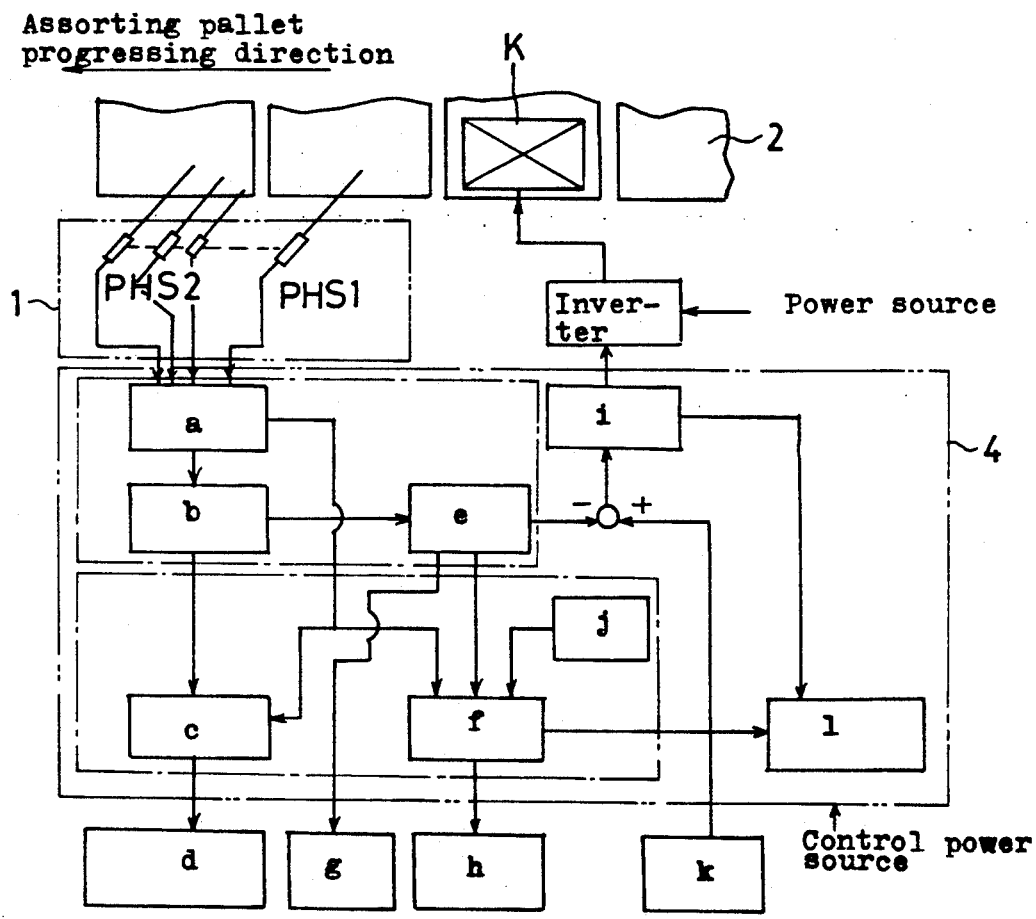
FIG. 5 is an explanatory drawing, showing the functional action of CPU of the synchronous detection control part.

When plural assorting carriers adjacent each other run along the predetermined travelling route, reaction plates 2 under each assorting carrier are arranged in a row at regular intervals as shown in FIG. 1 and FIG. 5. A rotor K of the linear motor is arranged at a part of the travelling route. By this rotor K thrust is generated at the reaction plate 2 and the assorting carrier is run.

The length L covering the width of a reaction plate 2 in progressing direction plus a gap between the rear end of a reaction plate and the forward end of the adjoining reaction plate is designated as one section for detecting (reaction plate fitting pitch). Within this one section L, sixteen photoelectric switches (PH1-PH16) are arranged at regular intervals as one set for detecting reaction plates 2 progressing in this one section L. Each photoelectric switch 1 (PH1-PH16) comprises a light emitting part 3a and a light receiving part 3b in pairs. When the reaction plate 2 is passed through between the light emitting part 3a and the light receiving part 3b, light is interrupted and this interruption is detected. With the progressing of the reaction plate 2, the photoelectric switch 1 operates in consecutive order from PH1 to PH16. A synchronous detection control part 4 is so constructed that it takes out a speed detecting signal of the assorting carrier shown in FIG. 2 as a pulse waveform, according to the movement of the reaction plate 2.

The synchronous detection control part 4 carries CPU 7 (which functions as a means 6 of detecting movement of the assorting carrier and as a control signal generating means 7), digital input 8, ROM 9, RAM 10, communication interface 11, digital output 12, analogue output 13, etc. The CPU 5 functions as shown in FIG. 5 and works as the means 6 of detecting movement of the assorting carrier and also as the control signal generating means 7.

Figure 4:
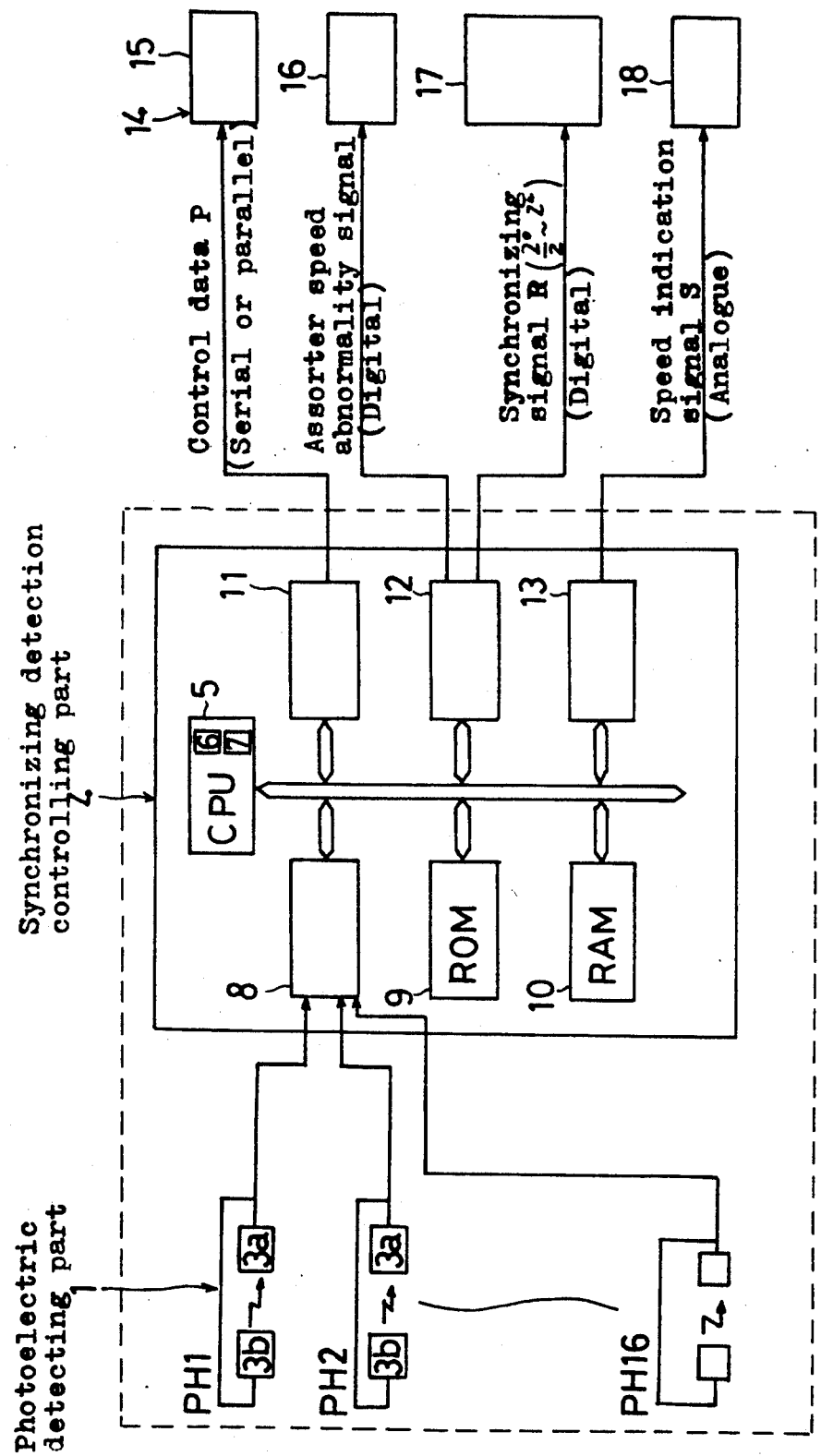
FIG. 4 is a block diagram of the apparatus of the present invention.

A goods assorting control part 14 includes an assorter data dealing device 15, an assorter control circuit 16, an assorting control device 17 and a linear motor control device 18. As shown in FIG. 4, control data P is sent to the synchronous detection control part 4. Assorter speed abnormality signals Q, synchronizing signals R and speed indication signals S are received from the synchronous detection control part 4.

Figure 2:
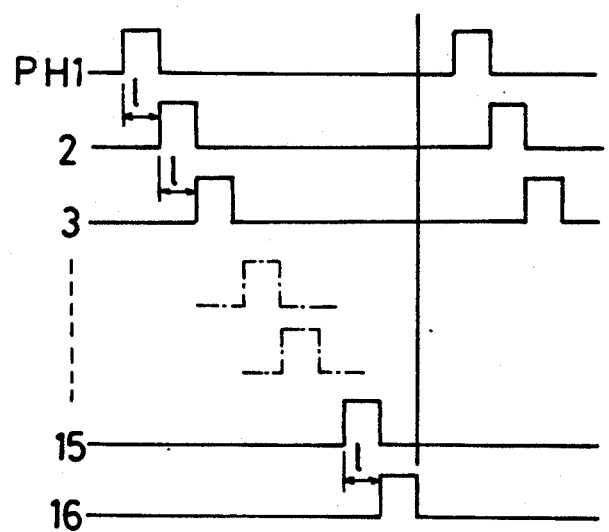
FIG. 2 is a drawing of pallet speed detecting signals by a photoelectric switch.

Under the above arrangement, the photoelectric detecting part 1 issues detection signals in FIG. 2 by sixteen photoelectric switches PH1–PH16, each comprising a light emitting part and a light receiving part in pairs, by utilizing movement of the reaction plate 2 of the assorting carrier.

Figure 3:
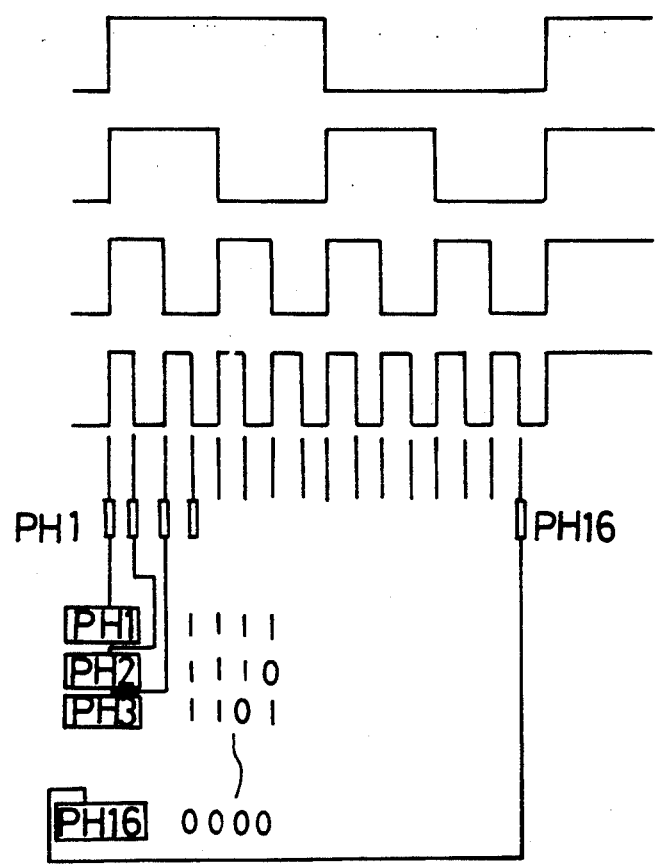
FIG. 3 is a drawing of synchronizing signals by the photoelectric switch.

As shown in FIG. 4 and FIG. 3, both detecting signals a, b determine the pulse period between ON and OFF of the input signal by sixteen photoelectric switches, form pulse and fractionize it, code information and output synchronizing signals R to the assorting control device 17.

According to the present invention, sixteen photoelectric switches, each having a light emitting part and a light receiving part in pairs, are arranged at regular intervals in each reaction plate fitting pitch so as to detect movement of the reaction plate, whereby detection of the speed of the assorting carrier and issuance of synchronizing signals are carried out for accurate assorting of goods to the specified destination.

What is claimed is:

1. A control system in a goods assorting apparatus, wherein goods can be divided accurately into a specified assorting destination by detecting a moving state of an assorting carrier which is driven by a linear motor driving system, wherein the instantaneous speed of a reaction plate provided for the assorting carrier is repeatedly calculated on the basis of the times at which the states of a large plurality of photoelectric switches changes, said photoelectric switches being more than two in number and being arranged at regular intervals in one section of a reaction plate fitting pitch and detecting movement of the reaction plate and, on the basis of such varying data, generation of synchronizing signals is carried out by a predetermined pattern and an absolute position of the reaction plate in the reaction plate fitting pitch is detected.

* * * * *